United States Patent

McKnight

[15] 3,651,425
[45] Mar. 21, 1972

[54] MULTIPLE UNIT LASER SYSTEM
[72] Inventor: William B. McKnight, Somerville, Ala.
[73] Assignee: The United States of America as represented by the Secretary of the Army
[22] Filed: Dec. 22, 1964
[21] Appl. No.: 421,153

[52] U.S. Cl. ........................................................331/94.5
[51] Int. Cl. ......................................H01s 3/02, H01s 3/09
[58] Field of Search................................................331/94.5

[56] References Cited

UNITED STATES PATENTS

| 2,927,187 | 3/1960 | Wendelken | 331/94.5 UX |
| 2,929,922 | 3/1960 | Shawlow et al. | 331/94.5 X |
| 3,164,781 | 1/1965 | Goldberg | 331/94.5 |
| 3,267,383 | 8/1966 | Lohmann | 331/94.5 UX |

*Primary Examiner*—Rodney D. Bennett, Jr.
*Assistant Examiner*—N. Moskowitz
*Attorney*—Harry M. Saragovitz, Edward J. Kelly and Herbert Berl

[57] ABSTRACT

A system for concentrating high energy laser beams having a plurality of laser modules directed to a common point. A single inductive energy source is connected to the modules for simultaneously energizing the lasers.

6 Claims, 4 Drawing Figures

PATENTED MAR 21 1972 3,651,425

William B. McKnight
INVENTOR.

BY Harry M. Saragovitz
Edward J. Kelly
Herbert Berl
Alfred E. Smith

MULTIPLE UNIT LASER SYSTEM

The invention described herein may be manufactured and used by or for the Government for governmental purposes without the payment of any royalty thereon.

This invention relates to multiple unit laser systems and more particularly to a multiple unit laser array energized by a large inductive energy storage system.

In order to exploit the military potential of the laser, it was determined that it was necessary to increase the energy output of these devices by orders of magnitude. As it became apparent that laser material could be produced in virtually arbitrary size and shape, the necessity of obtaining a large energy storage source capable of delivering energy at a high power was determined to be a critical element.

The uses of high energy lasers are manifold, in research for military applications as well as in medical and basic research, and the breakthroughs in techniques and energy levels have provided the impetus for programs to fully exploit the potentials of the high energy laser.

It is an object of the present invention to provide a multiple unit laser system for producing high energy radiation.

It is a further object of the invention to provide a multiple unit laser array excited from a single inductive energy source.

The present invention provides a laser system for studying the effects of high energy laser radiation on target materials, to excite spectroscopic lines never before observed, and as a medical research tool. The laser system to be described herein comprises a plurality of laser modules, a single inductive energy source and means for applying energy from the source of each of the lasers simultaneously.

The above enumerated objects, advantages and uses of the present invention will be more readily understood upon reading the following detailed description in conjunction with the accompanying drawing wherein.

Figure 1:
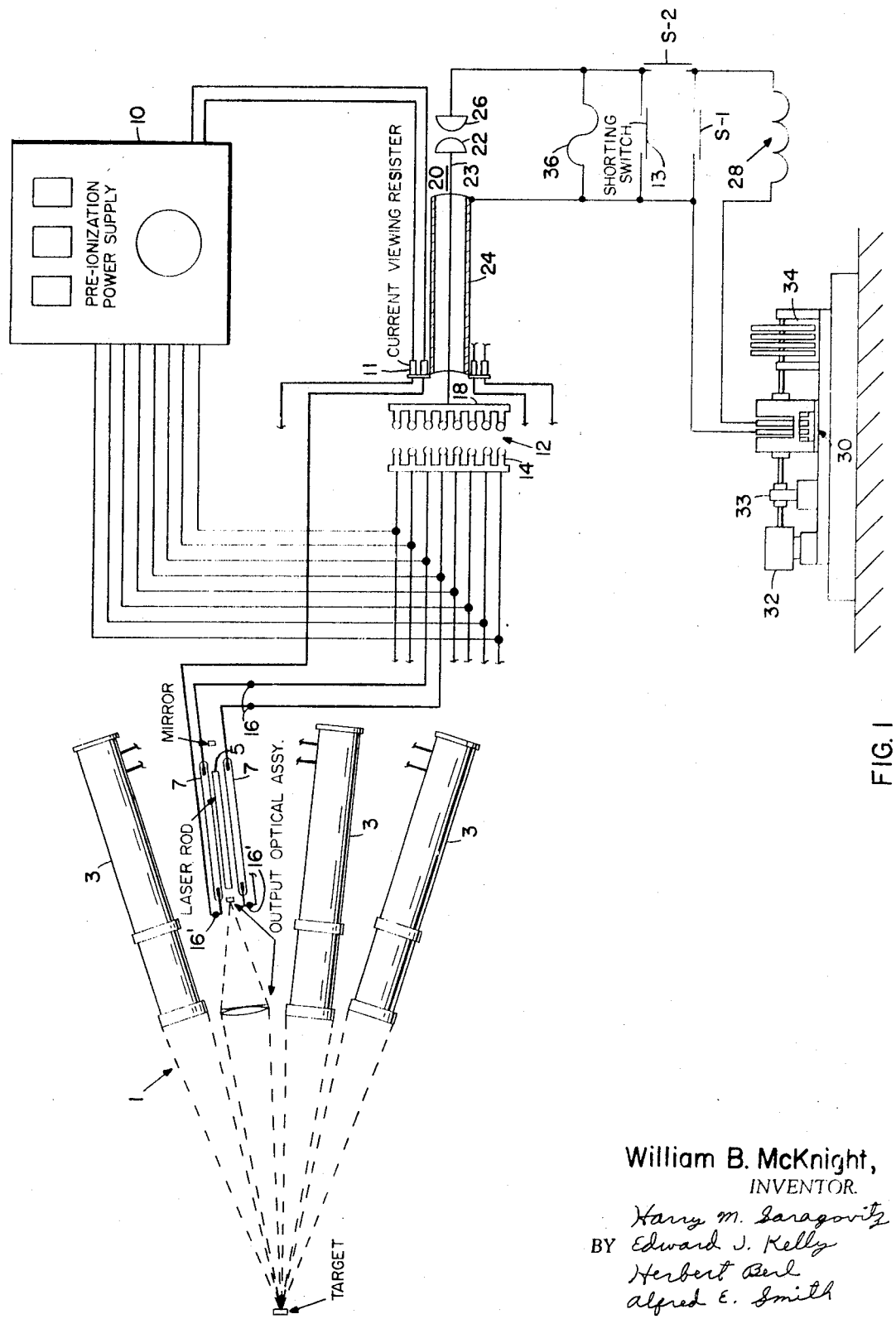
FIG. 1 is a functional diagram, partly in schematic, of a preferred embodiment of the invention.
Figure 2:
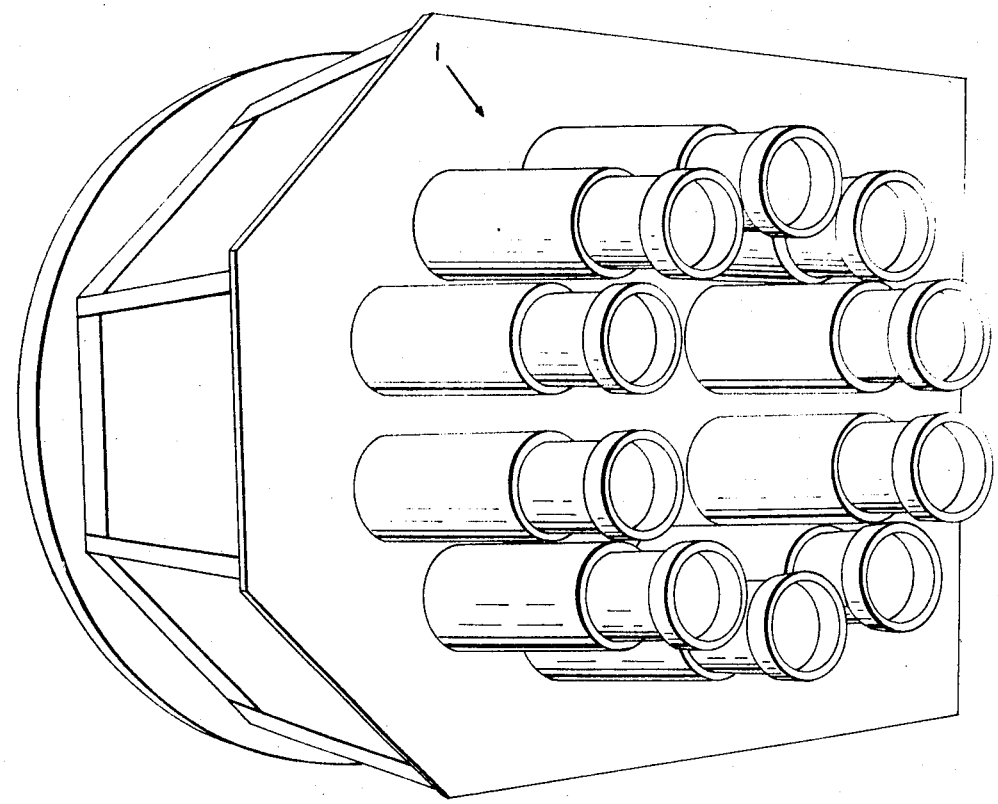
FIG. 2 illustrates the configuration of a laser array of the preferred embodiment of the invention.

The induction driven laser system illustrated in FIG. 1 comprises a multiple unit laser array 1 consisting of 10 modules 3. The laser modules are circularly arranged as shown in FIG. 2, in a manner directing them to a common point. Each module includes a laser rod 5 and two flashtubes 7. Each flashtube is connected to a pre-ionization power supply 10 through a current viewing resistor 11. The power supply 10 is a conventional power supply for maintaining the flashtubes in a continuous state of ionization whereby the firing current will not be required to breakdown or ionize the flashtubes. The resistor 11 is used to stabilize the pre-ionization current against variations due to the negative resistance characteristics of the flashtubes. A spark gap assembly 12 has a first set of electrodes 14 connected to terminals 16 of flashtubes 7 and a second set of electrodes 18 each connected to a common conductor. A master spark gap 20 is provided for energizing the electrodes of spark gap assembly 12. The master gap has an electrode 22 connected to a conductor rod 23 which is in turn connected to electrodes 18. A conductive sleeve 24 surrounds rod 23 and has one end connected to terminals 16' of flashtubes 7.

The energy for exciting the flashtubes is provided from an inductive storage coil 28 which is energized with a unipolar generator 30. The generator is driven by motor 32 via magnetic clutch 33. A switching fuse 36 is connected through switch S-2 across the coil for providing a discharge path for the coil during the period that switch S-1 is being opened. As is shown in FIG. 1, the switching fuse has one terminal connected to electrode 26 and one terminal connected to sleeve 24. Further, a shorting switch 13 is connected across the load (flashtubes) so that energy may be shorted out at any predetermined time.

Figure 3:
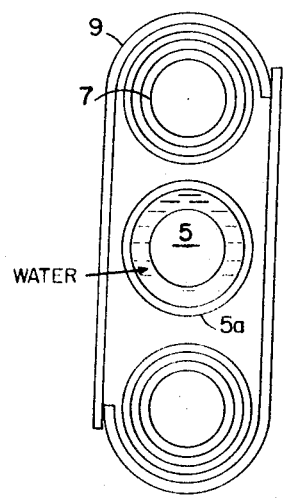
FIG. 3 illustrates a front view of the construction of a laser module.

The laser modules are constructed as illustrated in FIG. 3 and include neodymium glass laser rod 5 immersed in water contained in tube 5a. The laser rods are pumped by xenon flashtubes 7 disposed above and below the laser rod. Both the laser rod and the flashtubes are positioned within a silver plated reflector 9.

Figure 4:
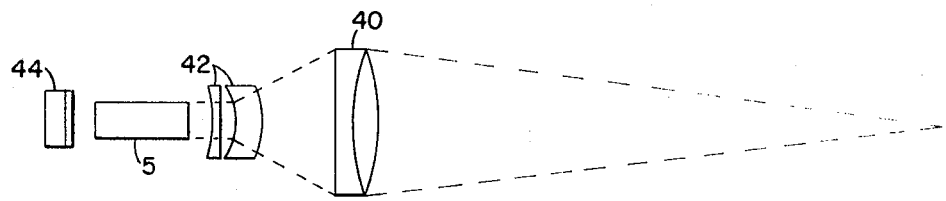
FIG. 4 illustrates the optics of the laser module.

The laser optics are illustrated in FIG. 4. Each module has a separate varifocal optical system including a positive doublet (objective) 40 and a negative doublet 42, both air spaced. Also shown in FIG. 4 is an adjustable gold plated stainless steel mirror 44 positioned to the rear of laser rod 5.

Turning now to the operation of the system, the operational cycle begins when motor 32 accelerates generator 30 to 3,550 r.p.m., via magnetic clutch 33. This requires about 15 minutes and stores about fifty million joules of kinetic energy in flywheel 34. The generator is then excited and connected to the induction coil through switch S-1. The current in coil 28 builds up to a maximum of 160,000 amperes in approximately 6 seconds storing five million joules in the coil. Switch S-2 is now closed and S-1 is opened causing the current to pass through fuse 36. The fuse ruptures in about 20 milliseconds and transfers the current to the laser array through master gap 20 and spark gap assembly 12.

The induction coil supplies 3,000 amperes to each xenon flashtube 7 for about 8 to 10 milliseconds. All 10 laser rods are energized simultaneously, delivering as much as 10,000 joules of optical energy to a target in a single pulse.

While this invention has been described with reference to a specific embodiment thereof, it is to be understood that other embodiments and modifications thereof may be made without departing from the scope of the appended claims.

I claim:

1. A multiple unit laser system comprising: a plurality of laser modules directed to a common point, each of said modules including a laser rod and at least one flashtube for pumping said rod; a pre-ionization power source connected to said flashtubes; an inductive energy storage means for energizing said flashtubes; and means for discharging said energy storage means into each of said plurality of flashtubes simultaneously.

2. A multiple unit laser system comprising: a plurality of laser modules arranged in a circular configuration and directed to a common point; each of said modules including a laser rod and at least one flashtube; a pre-ionization power source connected to said flashtubes; an inductive storage coil; means for energizing said storage coil; means for discharging said storage coil; fuse means for providing a discharge path for said storage coil for a limited period of time; and means for discharging said storage coil into said plurality of flashtubes simultaneously after said limited period of time.

3. A multiple unit laser system comprising: a plurality of laser modules arranged in a circular configuration and directed to a common point, each of said modules including a laser rod and at least one flashtube; an inductive storage coil; means for energizing said storage coil; means for discharging said storage coil; fuse means for providing a discharge path for said storage coil for a limited period of time; and means for discharging said storage coil into said plurality of flashtubes simultaneously after said limited period of time.

4. A multiple unit laser system comprising: a plurality of laser modules arranged in a circular configuration and directed to a common point, each of said modules including pumping means; a pre-ionization power supply connected to each of said pumping means for applying a pre-ionizing voltage thereto; a first spark gap assembly including a first plurality of electrodes connected respectively to first terminals of said plurality of pumping means, said assembly further including a second plurality of electrodes; a master spark gap assembly having a first electrode connected to said second plurality of electrodes of said first spark gap assembly and a second electrode disposed adjacent said first master gap electrode; a switching fuse having a first terminal connected to a second terminal of each of said pumping means and a second terminal connected to said second master gap electrode, a power supply having first and second terminals, said first terminal connected to the first terminal of said switching fuse; an inductive storage coil having one end connected to the second terminal of said power supply; a first switch connected between the other end of said coil and the first terminal of said power supply; and a second switch connected between said other end of said coil and said second terminal of said switching fuse.

5. A multiple unit laser system comprising: a plurality of laser modules arranged to be directed to a common point, each of said modules including at least one pumping device; a power supply having a first terminal connected to a first terminal of each of said pumping devices; an inductive storage means having a first terminal connected to a second terminal of said power supply; a first switch connected between a second terminal of said storage means and said first terminal of said power supply; a switching fuse having a first terminal connected to said first terminal of said power supply for providing a discharge path for said storage means for a limited period of time; a second switch connected between said second terminal of said storage means and a second terminal of said switching fuse; and means responsive to the energy discharged for said storage means after said limited period of time for energizing said pumping device.

6. A multiple unit laser system as set forth in claim 5, wherein said pumping device is a flashtube, and further including a pre-ionization power supply connected to each of said flashtubes.

* * * * *